US012811618B2

(12) United States Patent
Khesbak et al.

(10) Patent No.: US 12,811,618 B2
(45) Date of Patent: Nov. 24, 2026

(54) DISTRIBUTED RADIO FREQUENCY COMMUNICATION SYSTEMS FOR AUTOMOTIVE

(71) Applicant: Skyworks Solutions, Inc., Irvine, CA (US)

(72) Inventors: Sabah Khesbak, Irvine, CA (US); Mark Alan Richey, Carlsbad, CA (US); Ari T. Vauhkonen, Costa Mesa, CA (US); David Richard Pehlke, Westlake Village, CA (US); Kimmo J. Salmela, Espoo (FI)

(73) Assignee: Skyworks Solutions, Inc., Irvine, CA (US)

( * ) Notice: Subject to any disclaimer, the term of this patent is extended or adjusted under 35 U.S.C. 154(b) by 30 days.

(21) Appl. No.: 18/924,282

(22) Filed: Oct. 23, 2024

(65) Prior Publication Data

US 2025/0119172 A1 Apr. 10, 2025

Related U.S. Application Data

(63) Continuation of application No. 17/809,369, filed on Jun. 28, 2022, now Pat. No. 12,160,257.

(Continued)

(51) Int. Cl.
*H04B 1/3822* (2015.01)
*H04B 1/40* (2015.01)

(52) U.S. Cl.
CPC ............. *H04B 1/3822* (2013.01); *H04B 1/40* (2013.01)

(58) Field of Classification Search
CPC .......... H04B 1/3822; H04B 1/40; H04B 7/04; H04L 12/40; H04L 25/0264;

(Continued)

(56) References Cited

U.S. PATENT DOCUMENTS

| | | | | |
|---|---|---|---|---|
| 6,374,079 B1 * | 4/2002 | Hsu | H04B 7/18576 | 455/88 |
| 7,184,466 B1 * | 2/2007 | Seemann | H04B 1/0003 | 375/219 |

(Continued)

FOREIGN PATENT DOCUMENTS

| | | | | |
|---|---|---|---|---|
| CN | 1090452 A | * | 8/1994 | H04H 20/86 |
| CN | 1223525 A | * | 7/1999 | H04H 20/86 |

(Continued)

*Primary Examiner* — Berhanu Tadese

(74) *Attorney, Agent, or Firm* — Knobbe, Martens, Olson & Bear, LLP

(57) ABSTRACT

Distributed radio frequency (RF) communication systems for automotive are disclosed herein. In certain embodiments, an RF communication system for an automobile includes an RF module located close to an antenna to satisfy a specified output power with small insertion loss. Additionally, the baseband processor is placed remotely from the RF module in a different area of the automobile to provide a lower temperature environment. Additionally, the RF module communicates with the baseband processor in a digital format eliminating the need for higher cost cabling (for instance, due to higher noise immunity arising from using digital signaling) and using digital transfer cabling, which can already be present in the automobile for other purposes. The RF module can include an RF front-end (RFFE) and a transceiver used for providing frequency conversion, for instance, between RF and baseband.

20 Claims, 13 Drawing Sheets

Related U.S. Application Data

(60) Provisional application No. 63/203,131, filed on Jul. 9, 2021.

(58) Field of Classification Search
CPC ........ H04L 2012/40273; H04L 25/026; H03M 9/00; H04W 4/40
See application file for complete search history.

(56) References Cited

U.S. PATENT DOCUMENTS

| | | | | |
|---|---|---|---|---|
| 7,711,954 | B2 * | 5/2010 | Vantalon | G06F 21/73 713/168 |
| 8,151,110 | B2 * | 4/2012 | Vantalon | G06F 21/572 713/168 |
| 8,731,007 | B2 * | 5/2014 | Bar-Sade | H04L 1/203 370/538 |
| 8,879,610 | B2 * | 11/2014 | Yamamoto | H04L 7/0087 375/220 |
| 9,191,903 | B2 * | 11/2015 | Sasson | H03G 3/3042 |
| 9,559,703 | B2 * | 1/2017 | Cenger | G06F 1/10 |
| 9,692,427 | B2 * | 6/2017 | Allan | H03L 7/101 |
| 9,762,547 | B2 * | 9/2017 | Binder | G06F 21/602 |
| 9,794,983 | B2 * | 10/2017 | Petrucci | H01Q 1/38 |
| 10,056,931 | B2 * | 8/2018 | Haran | H04B 1/3822 |
| 10,084,591 | B1 * | 9/2018 | Palusa | H04L 7/0025 |
| 10,264,626 | B2 * | 4/2019 | Lee | H04W 84/042 |
| 10,340,950 | B2 * | 7/2019 | Klein | H03M 13/1125 |
| 10,523,452 | B2 * | 12/2019 | Kim | H04L 12/189 |
| 10,581,631 | B2 * | 3/2020 | Chamberlain | H04N 7/20 |
| 10,608,734 | B2 * | 3/2020 | Barbieri | G06F 9/45558 |
| 10,644,872 | B2 * | 5/2020 | Pavao Moreira | H04L 27/0008 |
| 10,652,214 | B2 * | 5/2020 | Binder | G06F 21/602 |
| 10,668,859 | B2 * | 6/2020 | Moeller | H04N 23/90 |
| 10,904,031 | B2 * | 1/2021 | Chamberlain | H04B 7/0617 |
| 10,972,108 | B1 * | 4/2021 | Li | H03L 7/0812 |
| 11,163,303 | B2 * | 11/2021 | Costin | B60W 50/023 |
| 11,251,971 | B2 * | 2/2022 | Way | H04W 12/069 |
| 11,303,612 | B2 * | 4/2022 | Binder | G06F 21/602 |
| 11,336,483 | B2 * | 5/2022 | Brobston | H04B 10/64 |
| 11,387,852 | B2 * | 7/2022 | Banin | H04B 1/04 |
| 11,391,814 | B2 * | 7/2022 | Cohen | G01S 7/295 |
| 11,876,785 | B2 * | 1/2024 | Binder | G06F 21/602 |
| 11,943,045 | B2 * | 3/2024 | Barbieri | G06F 9/45558 |
| 11,985,615 | B2 * | 5/2024 | Fertonani | H04W 56/0015 |
| 11,988,735 | B2 * | 5/2024 | Srinivas | G01S 11/08 |
| 12,050,283 | B2 * | 7/2024 | Srinivas | G01S 19/26 |
| 12,160,257 | B2 * | 12/2024 | Khesbak | H04B 1/3822 |
| 12,381,587 | B2 * | 8/2025 | Notari | H01Q 1/3208 |
| 12,483,537 | B2 * | 11/2025 | Binder | G06F 21/602 |
| 2002/0122503 | A1 * | 9/2002 | Agazzi | H04L 25/03159 375/316 |
| 2003/0179771 | A1 * | 9/2003 | Chan | H04L 12/40013 370/445 |
| 2006/0031676 | A1 * | 2/2006 | Vantalon | G06F 21/73 713/176 |
| 2006/0136702 | A1 * | 6/2006 | Vantalon | G06F 21/572 713/1 |
| 2011/0038286 | A1 * | 2/2011 | Ta | H04Q 11/02 370/430 |
| 2014/0003565 | A1 * | 1/2014 | Yamamoto | H04W 88/085 375/359 |
| 2015/0336521 | A1 | 11/2015 | Tofilescu et al. | |
| 2017/0039850 | A1 * | 2/2017 | Vanden Berg | B60W 30/18 |
| 2017/0127363 | A1 * | 5/2017 | Tamamoto | H04B 10/25752 |
| 2018/0012048 | A1 * | 1/2018 | Ricci | A61B 5/1171 |
| 2018/0034649 | A1 * | 2/2018 | Kim | H04L 12/18 |
| 2018/0062726 | A1 * | 3/2018 | Waight | H04L 27/0014 |
| 2018/0249532 | A1 * | 8/2018 | Lee | H04W 4/70 |
| 2018/0287696 | A1 * | 10/2018 | Barbieri | G06F 9/45558 |
| 2019/0116568 | A1 * | 4/2019 | Fertonani | H04W 56/00 |
| 2019/0250611 | A1 * | 8/2019 | Costin | B60W 50/023 |
| 2019/0293755 | A1 * | 9/2019 | Cohen | G01S 7/295 |
| 2020/0084602 | A1 * | 3/2020 | Kim | H04W 72/0473 |
| 2020/0204252 | A1 * | 6/2020 | Barbieri | G06F 9/45558 |
| 2020/0204522 | A1 * | 6/2020 | Binder | G06F 21/602 |
| 2020/0212943 | A1 * | 7/2020 | Banin | H04B 1/04 |
| 2021/0132177 | A1 * | 5/2021 | Srinivas | G01S 11/08 |
| 2021/0132182 | A1 * | 5/2021 | Srinivas | G01S 19/26 |
| 2023/0015565 | A1 * | 1/2023 | Khesbak | H04B 1/40 |
| 2023/0253997 | A1 * | 8/2023 | Notari | H01Q 1/241 455/552.1 |
| 2024/0171549 | A1 * | 5/2024 | Binder | G06F 21/602 |
| 2025/0119172 | A1 * | 4/2025 | Khesbak | H04B 1/3822 |
| 2025/0133062 | A1 * | 4/2025 | Binder | G06F 21/602 |
| 2025/0133063 | A1 * | 4/2025 | Binder | G06F 21/602 |
| 2025/0141848 | A1 * | 5/2025 | Binder | G06F 21/602 |
| 2025/0374038 | A1 * | 12/2025 | Binder | G06F 21/602 |
| 2026/0052127 | A1 * | 2/2026 | Binder | G06F 21/602 |

FOREIGN PATENT DOCUMENTS

| | | | | | |
|---|---|---|---|---|---|
| CN | 1285684 | A | * | 2/2001 | H04H 20/86 |
| CN | 1112808 | C | * | 6/2003 | H04H 20/86 |
| CN | 1121788 | C | * | 9/2003 | H04H 20/86 |
| CN | 101006725 | A | * | 7/2007 | G06F 21/73 |
| CN | 100417217 | C | * | 9/2008 | H04H 20/86 |
| CN | 101278505 | A | * | 10/2008 | |
| CN | 101006725 | B | * | 7/2011 | G06Q 10/02 |
| CN | 102238413 | A | * | 11/2011 | |
| CN | 202121717 | U | * | 1/2012 | |
| CN | 104821823 | A | * | 8/2015 | H03L 7/085 |
| CN | 104821824 | A | * | 8/2015 | H04L 12/6418 |
| CN | 105743524 | A | * | 7/2016 | H04L 27/152 |
| CN | 104821824 | B | * | 2/2018 | G06F 1/06 |
| CN | 104821823 | B | * | 5/2018 | H03L 7/1077 |
| CN | 105743524 | B | * | 9/2018 | H04B 7/0885 |
| CN | 110303985 | A | * | 10/2019 | B60R 1/00 |
| CN | 210174738 | U | * | 3/2020 | |
| CN | 111034080 | A | * | 4/2020 | H03M 13/1125 |
| CN | 111684771 | A | * | 9/2020 | H04L 25/49 |
| CN | 111983615 | | | 11/2020 | |
| CN | 112689083 | A | * | 4/2021 | |
| CN | 112810550 | A | * | 5/2021 | B60R 16/0231 |
| CN | 113078918 | | | 7/2021 | |
| CN | 113359507 | A | * | 9/2021 | G05B 17/02 |
| CN | 109982454 | B | * | 5/2022 | H04W 84/042 |
| CN | 111034080 | B | * | 10/2022 | H03M 13/09 |
| CN | 112689083 | B | * | 11/2022 | |
| CN | 115664446 | A | * | 1/2023 | H04B 1/3822 |
| CN | 115916601 | A | * | 4/2023 | B60R 16/0231 |
| DE | 112018005256 | T5 | * | 7/2020 | H04L 1/203 |
| DE | 102022206925 | A1 | * | 1/2023 | H04B 1/3822 |
| EP | 1811420 | A2 | * | 7/2007 | G06F 21/572 |
| EP | 2902866 | A1 | * | 8/2015 | G06F 1/06 |
| EP | 2903164 | A1 | * | 8/2015 | H03L 7/101 |
| EP | 2903164 | B1 | * | 8/2016 | H03L 7/08 |
| EP | 2902866 | B1 | * | 3/2018 | G06F 1/06 |
| EP | 3367678 | A1 | * | 8/2018 | H04N 23/90 |
| EP | 3396969 | | | 10/2018 | |
| EP | 3673595 | B1 | * | 6/2022 | H03M 13/09 |
| EP | 3591435 | B1 | * | 8/2022 | H04L 27/0008 |
| EP | 3685555 | B1 | * | 12/2025 | H04L 7/0331 |
| EP | 4693975 | A2 | * | 2/2026 | H04L 7/0331 |
| GB | 2610285 | A | * | 3/2023 | H04L 25/026 |
| JP | 2007-228579 | | | 9/2007 | |
| JP | 2019125923 | A | * | 7/2019 | H04B 7/06 |
| JP | 2023010626 | A | * | 1/2023 | H04B 1/40 |
| KR | 20160080828 | A | * | 7/2016 | H04L 25/20 |
| KR | 20160082095 | A | * | 7/2016 | H04L 27/26 |
| KR | 20180011338 | A | * | 1/2018 | G06F 3/0644 |
| KR | 20200045507 | A | * | 5/2020 | H04L 25/49 |
| KR | 20230009846 | A | * | 1/2023 | H04B 1/40 |
| MY | 172058 | A | * | 11/2019 | |
| TW | 2017-14443 | | | 4/2017 | |
| TW | 202308419 | A | * | 2/2023 | H04B 1/3822 |
| WO | WO-2006017733 | A1 | * | 2/2006 | G06Q 10/02 |
| WO | WO-2012085908 | A2 | * | 6/2012 | G06F 21/602 |
| WO | WO-2017058568 | A1 | * | 4/2017 | H04H 20/78 |
| WO | WO-2017070635 | A1 | * | 4/2017 | H04W 36/22 |
| WO | WO-2018017468 | A1 | * | 1/2018 | H04W 88/085 |
| WO | WO-2019040218 | A1 | * | 2/2019 | H04L 1/0065 |
| WO | WO-2019055894 | A1 | * | 3/2019 | H04L 1/1607 |
| WO | WO-2019142656 | A1 | * | 7/2019 | H04W 4/48 |

(56) References Cited

FOREIGN PATENT DOCUMENTS

| | | | | | |
|---|---|---|---|---|---|
| WO | WO 2020/104305 | | | 5/2020 | |
| WO | WO-2020154159 | A1 | * | 7/2020 | .......... H04W 12/068 |
| WO | WO-2021262245 | A1 | * | 12/2021 | ........... G06V 10/147 |

* cited by examiner

DISTRIBUTED RADIO FREQUENCY COMMUNICATION SYSTEMS FOR AUTOMOTIVE

CROSS-REFERENCE TO RELATED APPLICATIONS

This application is a continuation of U.S. patent application Ser. No. 17/809,369, filed Jun. 28, 2022 and titled "DISTRIBUTED RADIO FREQUENCY COMMUNICATION SYSTEMS FOR AUTOMOTIVE," which claims the benefit of priority under 35 U.S.C. § 119 of U.S. Provisional Patent Application No. 63/203,131, filed Jul. 9, 2021 and titled "DISTRIBUTED RADIO FREQUENCY COMMUNICATION SYSTEMS FOR AUTOMOTIVE," which is herein incorporated by reference in its entirety.

BACKGROUND

Technical Field

Embodiments of the invention relate to electronic systems, and in particular, to radio frequency (RF) electronics.

Description of Related Technology

Radio frequency (RF) communication systems transmit and receive RF signals via antennas. RF signals have a frequency in the range from about 30 kHz to 300 GHz, for instance, in the range of about 400 MHz to about 7.125 GHz for Frequency Range 1 (FR1) of the Fifth Generation (5G) communication standard or in the range of about 24.250 GHz to about 71.000 GHz for Frequency Range 2 (FR2) of the 5G communication standard.

SUMMARY

In certain embodiments, the present disclosure relates to a distributed radio frequency communication system for an automobile, the distributed radio frequency communication system including a digital processing circuit, cabling, a first serializer/deserializer circuit electrically connected between the digital processing circuit and the cabling, a first radio frequency module, and a second serializer/deserializer circuit electrically connected between the first radio frequency module and the cabling. The first serializer/deserializer circuit and the second serializer/deserializer circuit are configured to communicate digital data over the cabling.

In various embodiments, the cabling includes a twisted pair.

In a number of embodiments, the cabling includes an Ethernet cable.

In several embodiments, the digital processing circuit includes a baseband processor.

In some embodiments, the first radio frequency module includes at least one transceiver and at least one radio frequency front-end. According to a number of embodiments, the distributed radio frequency communication system further includes at least one antenna coupled to the at least one radio frequency front-end. In accordance with several embodiments, the distributed radio frequency communication system further includes a second radio frequency module, the second serializer/deserializer circuit electrically connected between the second radio frequency module and the cabling.

In several embodiments, the distributed radio frequency communication system further includes a second radio frequency module, and a third serializer/deserializer circuit electrically connected between the second radio frequency module and the cabling. According to a number of embodiments, the cabling includes a common cable shared by the second serializer/deserializer circuit and the third serializer/deserializer circuit. In accordance with various embodiments, the cabling includes a first cable connected between the second serializer/deserializer circuit and the first serializer/deserializer circuit, and a second cable connected between the third serializer/deserializer circuit and the first serializer/deserializer circuit.

In various embodiments, the distributed radio frequency communication system further includes at least one automotive system configured to communicate with the digital processing circuit by way of the second serializer/deserializer circuit, the cabling, and the first serializer/deserializer circuit.

In some embodiments, the digital data includes in-phase and quadrature-phase data representing a radio frequency transmit signal.

In certain embodiments, the present disclosure relates to an automobile. The automobile includes a digital processing circuit in a first location of the automobile, cabling, a first serializer/deserializer circuit electrically connected between the digital processing circuit and the cabling and co-located with the digital processing circuit, a first radio frequency module in a second location of the automobile, and a second serializer/deserializer circuit electrically connected between the first radio frequency module and the cabling and co-located with the first radio frequency module, the first serializer/deserializer circuit and the second serializer/deserializer circuit configured to communicate digital data over the cabling.

In several embodiments, the cabling includes a twisted pair.

In various embodiments, the cabling includes an Ethernet cable.

In a number of embodiments, the digital processing circuit includes a baseband processor.

In some embodiments, the first radio frequency module includes at least one transceiver and at least one radio frequency front-end.

In several embodiments, the automobile further includes at least one antenna coupled to the at least one radio frequency front-end and co-located with the at least one radio frequency front-end. According to a number of embodiments, the at least one antenna includes an antenna positioned on a roof, a bumper, a trunk or a mirror of the car.

In various embodiments, the first location is of a lower temperature than the second location.

In some embodiments, the automobile further includes a second radio frequency module, the second serializer/deserializer circuit electrically connected between the second radio frequency module and the cabling.

In several embodiments, the automobile further includes a second radio frequency module, and a third serializer/deserializer circuit electrically connected between the second radio frequency module and the cabling. According to a number of embodiments, the cabling includes a common cable shared by the second serializer/deserializer circuit and the third serializer/deserializer circuit. In accordance with various embodiments, the cabling includes a first cable connected between the second serializer/deserializer circuit and the first serializer/deserializer circuit, and a second cable connected between the third serializer/deserializer circuit and the first serializer/deserializer circuit.

In some embodiments, the automobile further includes at least one automotive system configured to communicate with the digital processing circuit by way of the second serializer/deserializer circuit, the cabling, and the first serializer/deserializer circuit.

According to a number of embodiments, the at least one automotive system includes a radar or a camera.

In several embodiments, the digital data includes in-phase and quadrature-phase data representing a radio frequency transmit signal.

In certain embodiments, the present disclosure relates to a method of radio frequency communication in an automobile. The method includes generating digital data using a digital processing circuit located in a first location of an automobile, serializing the digital data using a first serializer/deserializer circuit co-located with the digital processing circuit, sending the serialized digital data to a second serializer/deserializer circuit over cabling, and deserialized the serialized digital data to generate recovered digital data, and processing the recovered digital data using a radio frequency module to generate a radio frequency transmit signal, the radio frequency module co-located with the second serializer/deserializer circuit in a second location of the automobile.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1:
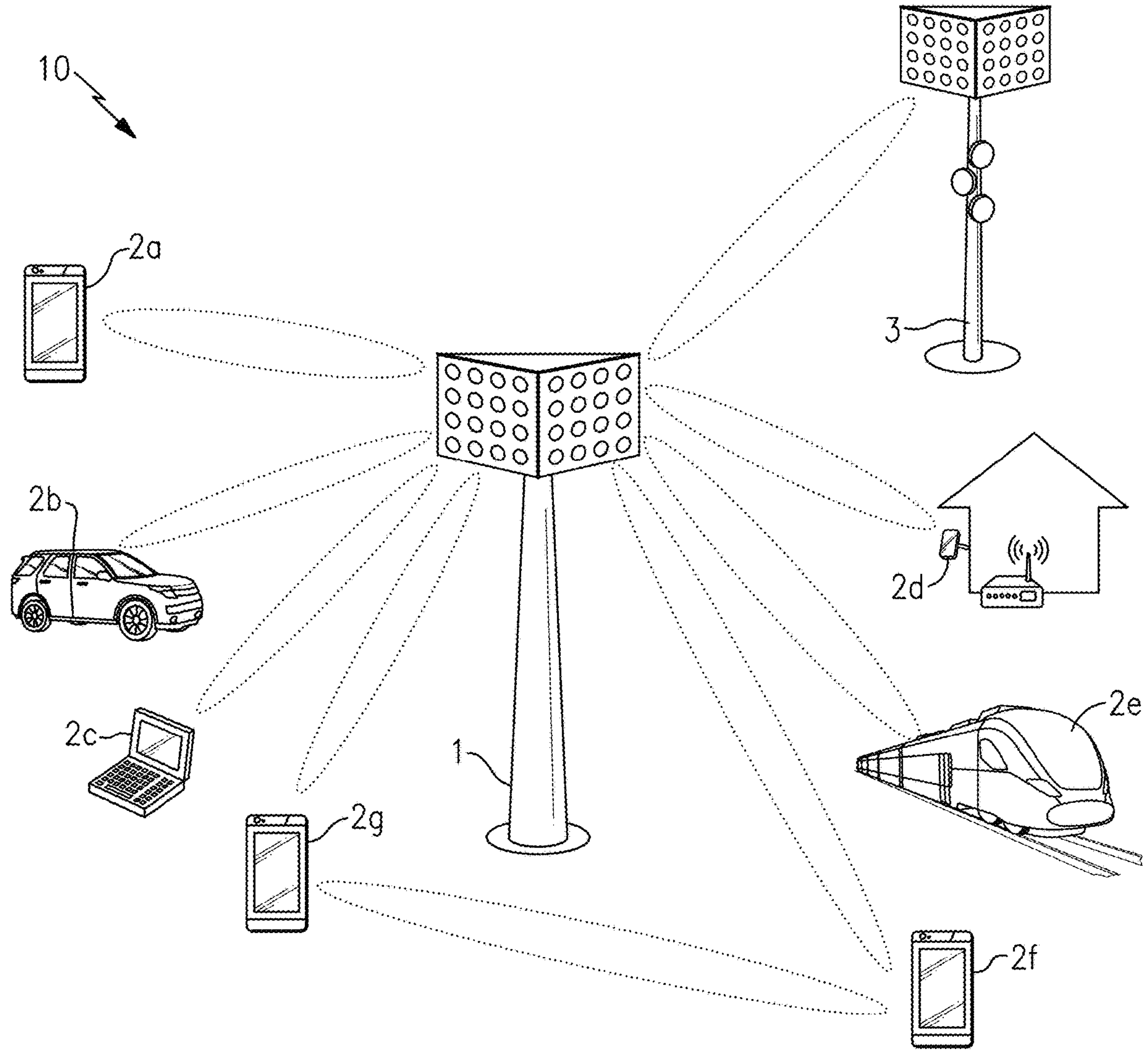
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and introduced Phase 2 of 5G technology in Release 16. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2*a*, a wireless-connected automobile 2*b*, a laptop 2*c*, a stationary wireless device 2*d*, a wireless-connected train 2*e*, a second mobile device 2*f*, and a third mobile device 2*g*.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2*g* and mobile device 2*f*).

In certain implementations, a base station and/or user equipment communicates using beamforming. For example, beamforming can be used to focus signal strength to overcome path losses, such as high loss associated with communicating over high signal frequencies. In certain embodiments, cellular user equipment can communicate using beamforming and/or other techniques over a wide range of frequencies, including, for example, FR2-1 (24 GHz to 52 GHZ), FR2-2 (52 GHz to 71 GHZ), and/or FR1 (400 MHz to 7125 MHZ).

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning cach user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (cMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IOT) applications.

The communication network 10 of FIG. 1 can be used to support a wide variety of advanced communication features, including, but not limited to, eMBB, uRLLC, and/or mMTC.

Figure 2A:
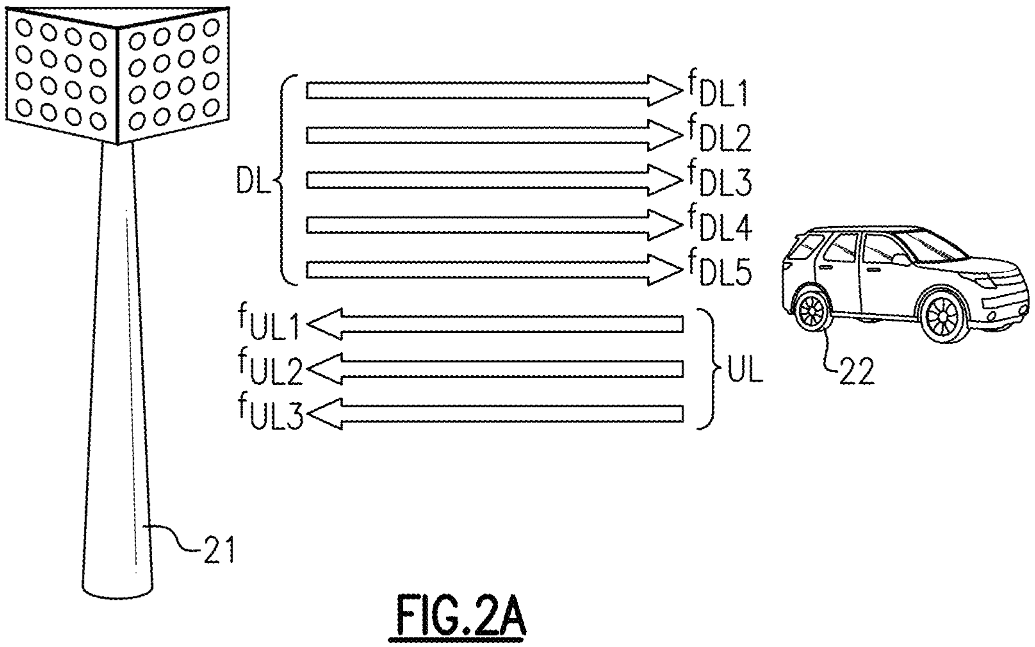
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a wireless-connected automobile 22. As used herein, an automobile includes not only sedans, but other vehicles as well including, but not limited to, sport utility vehicles (SUVs) and trucks. As shown in FIG. 2A, the communications link includes a downlink channel used for RF communications from the base station 21 to the automobile 22, and an uplink channel used for RF communications from the automobile 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to the automobile 22, while providing a relatively slower data rate for uploading data from the automobile 22 to the cloud.

In the illustrated example, the base station 21 and the automobile 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications can change over time. For example, the number of aggregated carriers can change as the automobile 22 moves through the communication network and/or as network usage changes over time.

Figure 2B:
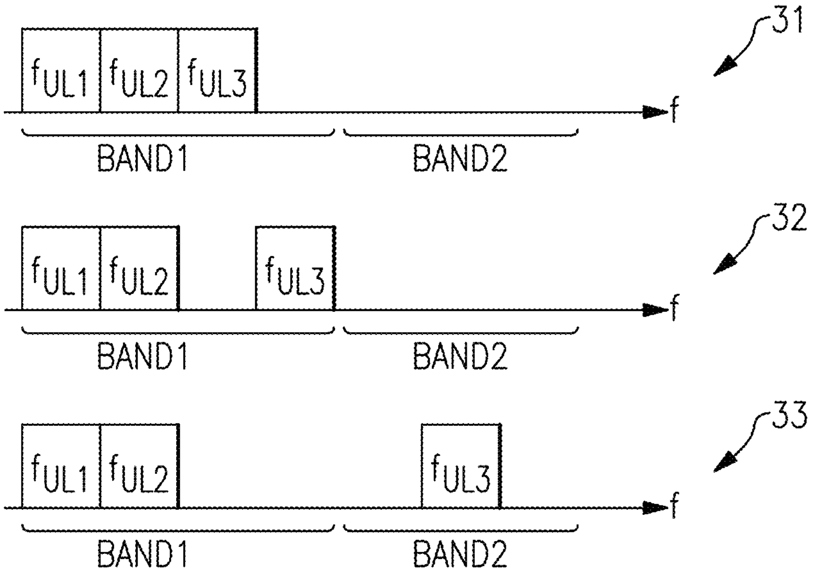
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier fuLi, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers full and full of a first frequency band BANDI with component carrier fuLa of a second frequency band BAND2.

Figure 2C:
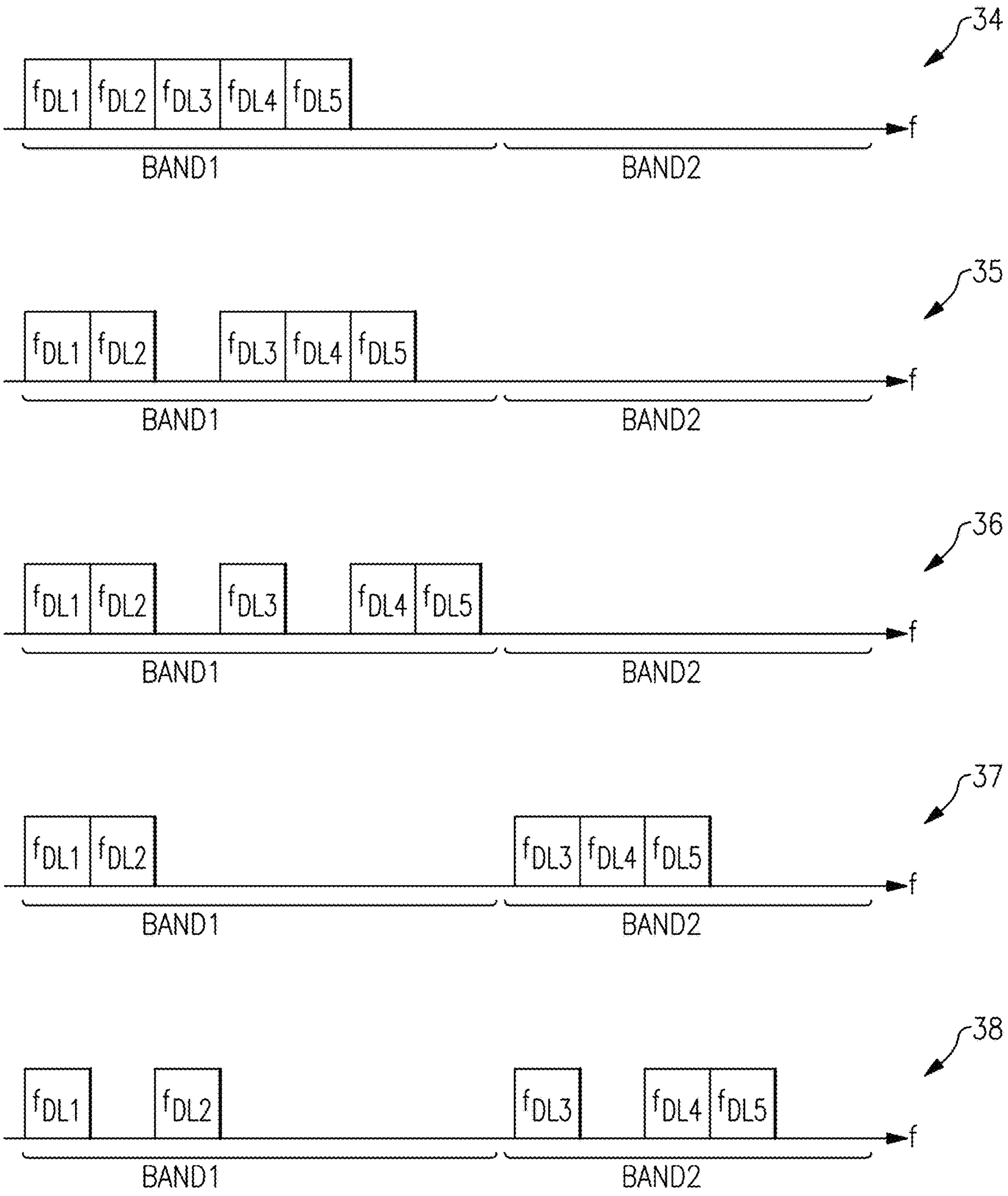
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device (corresponding to the automobile 22, in this example) with a primary component carrier (PCC) or anchor carrier for uplink and a PCC for downlink. Additionally, when communicating using a single frequency carrier for uplink or downlink, the PCC is used. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink. Furthermore, NR-U can operate on top of LAA/eLAA over a 5 GHz band (5150 to 5925 MHz) and/or a 6 GHz band (5925 MHz to 7125 MHz).

Figure 3A:
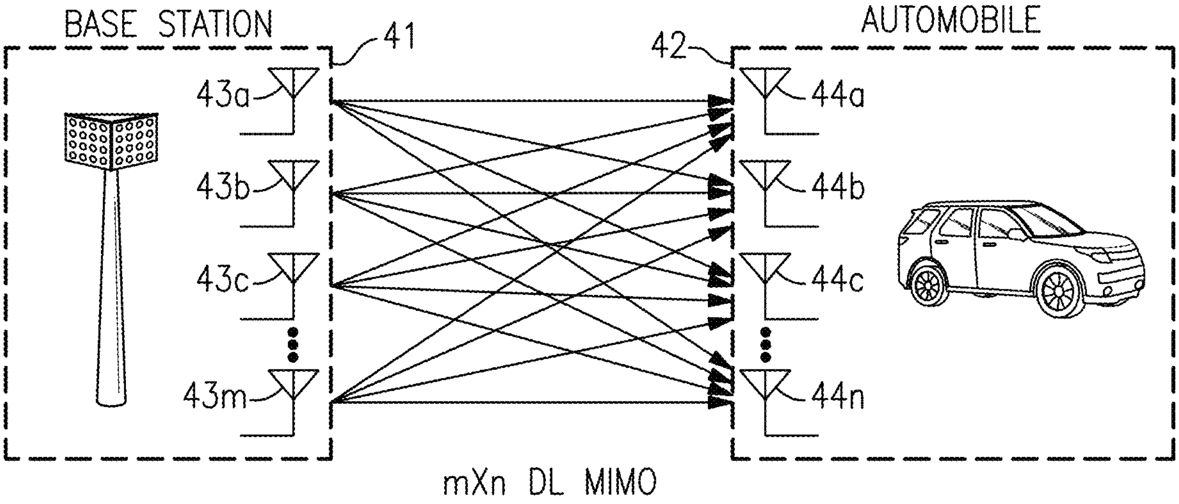
FIG. 3A is a schematic diagram of one example of a downlink channel using multi-input and multi-output (MIMO) communications.
Figure 3B:
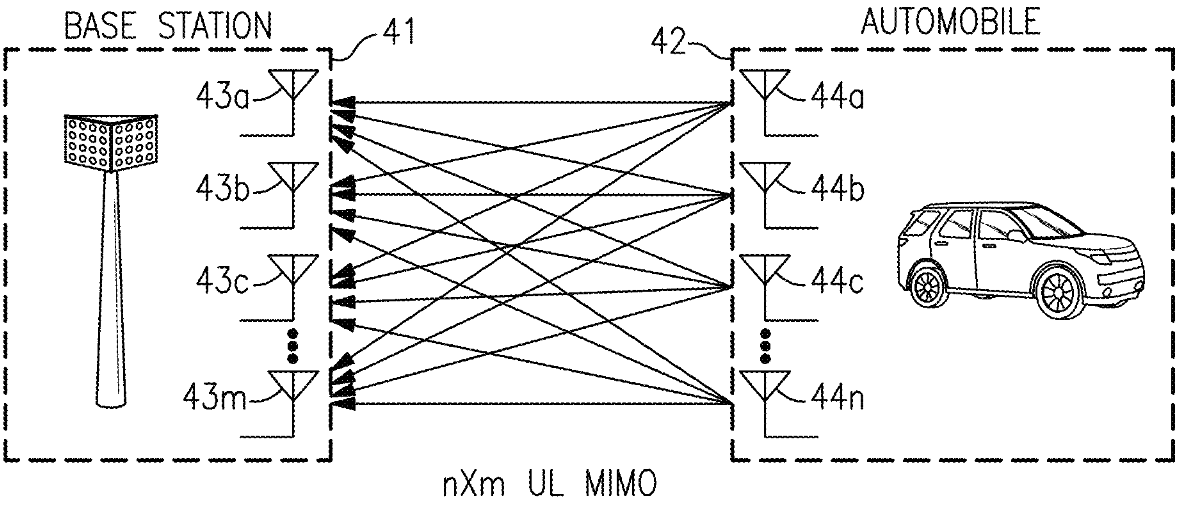
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas of the UE (corresponding to a wireless-connected automobile 42, in this example). For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43*a*, 43*b*, 43*c*, . . . 43*m* of the base station 41 and receiving using N antennas 44*a*, 44*b*, 44*c*, . . . 44*n* of the automobile 42. Accordingly, FIG. 3A illustrates an example of m×n DL MIMO.

Likewise, MIMO order for uplink communications can be described by a number of transmit antennas of the UE (for example, the automobile 42, in this example), and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44*a*, 44*b*, 44*c*, . . . 44*n* of the automobile 42 and receiving using M antennas 43*a*, 43*b*, 43*c*, . . . 43*m* of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
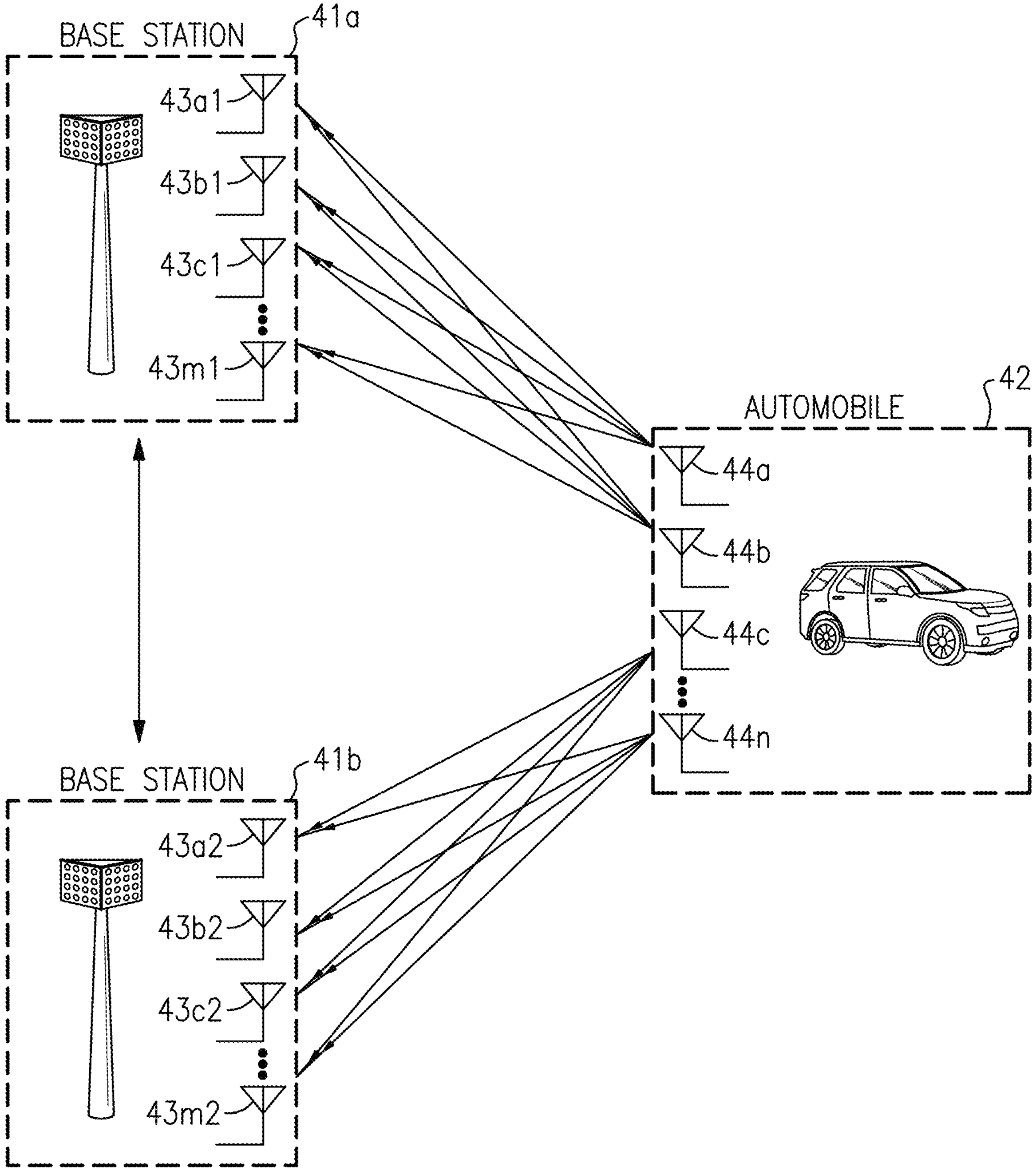
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44*a*, 44*b*, 44*c*, . . . 44*n* of the automobile 42. Additional a first portion of the uplink transmissions are received using M antennas 43*a*1, 43*b*1, 43*c*1, . . . 43*m*1 of a first base station 41*a*, while a second portion of the uplink transmissions are received using M antennas 43*a*2, 43*b*2, 43*c*2, . . . 43*m*2 of a second base station 41*b*. Additionally, the first base station 41*a* and the second base station 41*b* communication with one another over wired, optical, and/or wireless links.

The MIMO scenario of FIG. 3C illustrates an example in which multiple base stations cooperate to facilitate MIMO communications.

Figure 4A:
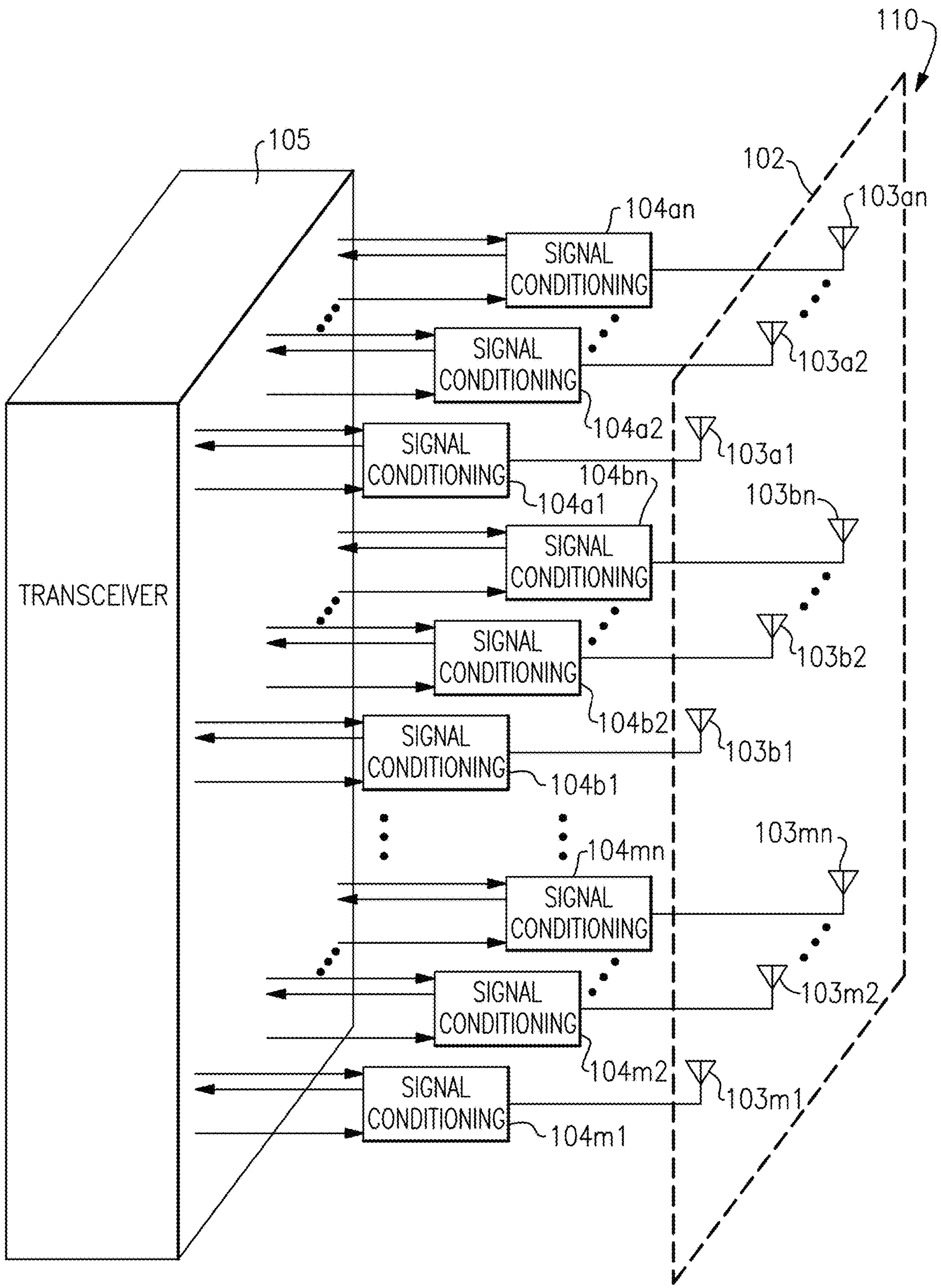
FIG. 4A is a schematic diagram of one example of a communication system that operates with beamforming.

FIG. 4A is a schematic diagram of one example of a communication system 110 that operates with beamforming. The communication system 110 includes a transceiver 105, signal conditioning circuits 104*a*1, 104*a*2 . . . 104*an*, 104*b*1, 104*b*2 . . . 104*bn*, 104*m*1, 104*m*2 . . . 104*mn*, and an antenna array 102 that includes antenna elements 103*a*1, 103*a*2 . . . 103*an*, 103*b*1, 103*b*2 . . . 103*bn*, 103*m*1, 103*m*2 . . . 103*mn*.

Communications systems that communicate using millimeter wave carriers (for instance, 30 GHz to 300 GHz), centimeter wave carriers (for instance, 3 GHz to 30 GHZ), and/or other frequency carriers can employ an antenna array to provide beam formation and directivity for transmission and/or reception of signals.

For example, in the illustrated embodiment, the communication system 110 includes an array 102 of m×n antenna elements, which are each controlled by a separate signal conditioning circuit, in this embodiment. As indicated by the ellipses, the communication system 110 can be implemented with any suitable number of antenna elements and signal conditioning circuits. The signal conditioning circuits can be included as a part of an RF front-end.

With respect to signal transmission, the signal conditioning circuits can provide transmit signals to the antenna array 102 such that signals radiated from the antenna elements combine using constructive and destructive interference to generate an aggregate transmit signal exhibiting beam-like qualities with more signal strength propagating in a given direction away from the antenna array 102.

In the context of signal reception, the signal conditioning circuits process the received signals (for instance, by separately controlling received signal phases) such that more signal energy is received when the signal is arriving at the antenna array 102 from a particular direction. Accordingly, the communication system 110 also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver 105 provides transmit signals to the signal conditioning circuits and processes signals received from the signal conditioning circuits. As shown in FIG. 4A, the transceiver 105 generates control signals for the signal conditioning circuits. The control signals can be used for a variety of functions, such as controlling the gain and phase of transmitted and/or received signals to control beamforming.

Figure 4B:
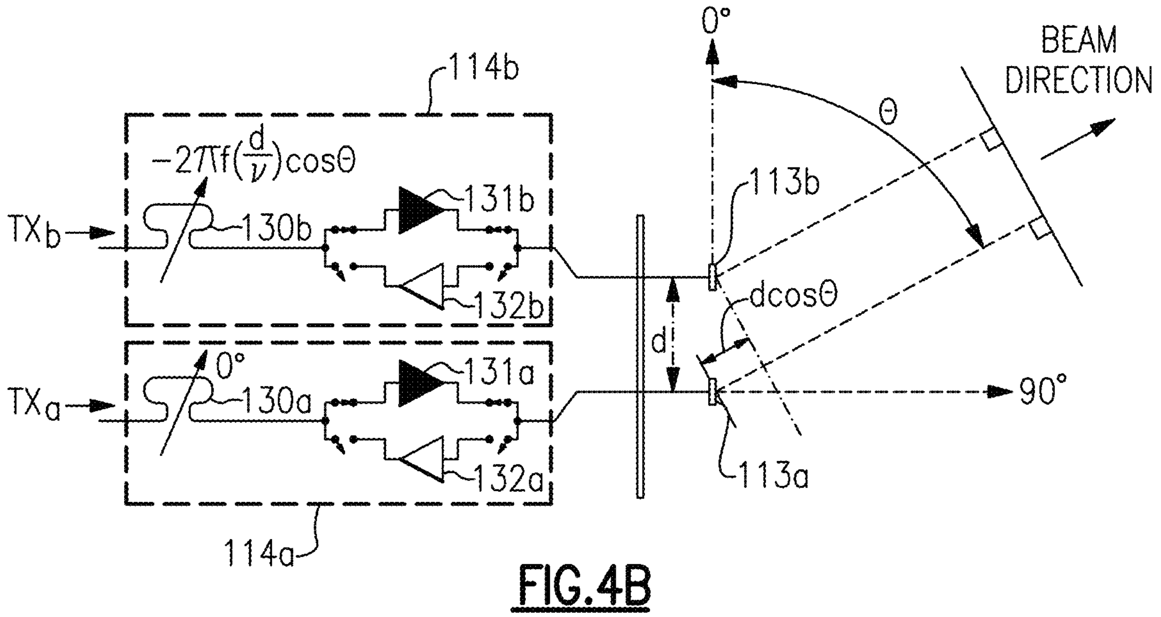
FIG. 4B is a schematic diagram of one example of beamforming to provide a transmit beam.

FIG. 4B is a schematic diagram of one example of beamforming to provide a transmit beam. FIG. 4B illustrates a portion of a communication system including a first signal conditioning circuit 114*a*, a second signal conditioning circuit 114*b*, a first antenna element 113*a*, and a second antenna element 113*b*.

Although illustrated as included two antenna elements and two signal conditioning circuits, a communication system can include additional antenna elements and/or signal conditioning circuits. For example, FIG. 4B illustrates one embodiment of a portion of the communication system 110 of FIG. 4A.

The first signal conditioning circuit 114*a* includes a first phase shifter 130*a*, a first power amplifier 131*a*, a first low noise amplifier (LNA) 132*a*, and switches for controlling selection of the power amplifier 131*a* or LNA 132*a*. Additionally, the second signal conditioning circuit 114*b* includes a second phase shifter 130*b*, a second power amplifier 131*b*, a second LNA 132*b*, and switches for controlling selection of the power amplifier 131*b* or LNA 132*b*.

Although one embodiment of signal conditioning circuits is shown, other implementations of signal conditioning circuits are possible. For instance, in one example, a signal conditioning circuit includes one or more band filters, duplexers, and/or other components.

In the illustrated embodiment, the first antenna element 113*a* and the second antenna element 113*b* are separated by a distance d. Additionally, FIG. 4B has been annotated with an angle ⊖, which in this example has a value of about 90° when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 113*a*, 113*b*, a desired transmit beam angle O can be achieved. For example, when the first phase shifter 130*a* has a reference value of 0°, the second phase shifter 130*b* can be controlled to provide a phase shift of about $-2\pi f(d/v)\cos\ominus$ radians, where f is the fundamental frequency of the transmit signal, d is the distance between the antenna elements, v is the velocity of the radiated wave, and π is the mathematic constant pi.

In certain implementations, the distance d is implemented to be about ½λ, where λ is the wavelength of the fundamental component of the transmit signal. In such implementations, the second phase shifter 130*b* can be controlled to provide a phase shift of about-xcose radians to achieve a transmit beam angle ⊖.

Accordingly, the relative phase of the phase shifters 130*a*, 130*b* can be controlled to provide transmit beamforming. In certain implementations, a baseband processor and/or a transceiver (for example, the transceiver 105 of FIG. 4A) controls phase values of one or more phase shifters and gain values of one or more controllable amplifiers to control beamforming.

Figure 4C:
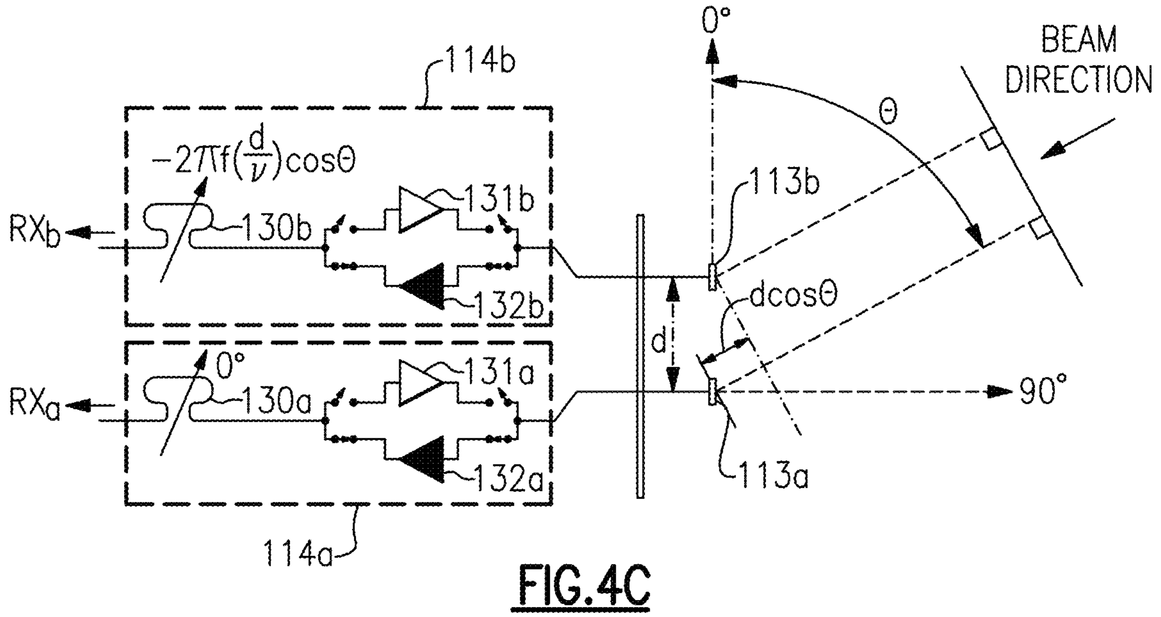
FIG. 4C is a schematic diagram of one example of beamforming to provide a receive beam.

FIG. 4C is a schematic diagram of one example of beamforming to provide a receive beam. FIG. 4C is similar to FIG. 4B, except that FIG. 4C illustrates beamforming in the context of a receive beam rather than a transmit beam.

As shown in FIG. 4C, a relative phase difference between the first phase shifter 130*a* and the second phase shifter 130*b* can be selected to about equal to $-2\pi f(d/v)\cos\ominus$ radians to achieve a desired receive beam angle ⊖. In implementations in which the distance d corresponds to about ½λ, the phase difference can be selected to about equal to $-\pi\cos\ominus$ radians to achieve a receive beam angle ⊖.

Although various equations for phase values to provide beamforming have been provided, other phase selection values are possible, such as phase values selected based on implementation of an antenna array, implementation of signal conditioning circuits, and/or a radio environment.

Distributed Radio Frequency Communication Systems for Automotive

To provide automotive cellular connectivity, a network access device (NAD) and companion radio frequency front-end (RFFE) can be placed in a compartment inside of an automobile. Additionally, RF cabling can be extended from the RFFE to different antennas positioned around the automobile. For example, such antennas can include an antenna in a fin on a roof of an automobile, an antenna at the back of the automobile's trunk, an antenna at the end of external back view mirrors of the automobile, and/or other antennas.

When implementing the automotive RF communication system in this manner, RF signals travel through long RF cables to reach a particular antenna. To achieve sufficiently low noise, these RF cables are very lossy, expensive, and/or lead to performance degradations. For instance, for an RF communication system that includes a 23 dBm transmitter, the RFFE could generate RF signals of 31 dBm of power to overcome cable losses. However, such high signal power levels are very inefficient and generate high amounts of heat which increases device junction temperatures. Alternatively, the RFFE could g enerate RF signals of 23 dBm of power to improve efficiency and lower heat generation. However, the lower signal power can reduce the power out of the antenna to 15 dBm, which will degrade the communication link (particularly at the edge of a cell) and may lead to a call drop.

To address the loss arising from long RF cables, an RF signal booster can be placed between the RFFE and the antenna. For example, the RF signal booster can correspond to a second or booster RFFE. However, such an approach is inefficient as a desired amount of power (for instance, 23 dBm) is generated twice (once at the main RFFE and again at the booster RFFE) and does not solve the problem of the expensive cabling.

Distributed RF communication systems for automotive are disclosed herein. In certain embodiments, an RF communication system for an automobile includes an RF module located close to an antenna to satisfy a specified output power with small insertion loss. Additionally, the baseband processor is placed remotely from the RF module in a different area of the automobile to provide a lower temperature environment. Additionally, the RF module communicates with the baseband processor in a digital format eliminating the need for higher cost cabling (for instance, due to higher noise immunity arising from using digital signaling) and using digital transfer cabling, which can already be present in the automobile for other purposes. The RF module can include an RF front-end (RFFE) and a transceiver used for providing frequency conversion, for instance, between RF and baseband.

By implementing the automobile's RF communication system in this manner, losses between the RFFE and the antenna are reduced (for instance, to a minimum or near minimum value) to provide high signal-to-noise ratio (SNR) and support longer coverage distance and/or higher data rate.

In certain implementations, serializers and deserializers are placed on opposite ends of the digital transfer cabling to support transfer of data between the RF module and the baseband processor. For example, a serializer can convert all in-phase (I) and quadrature-phase (Q) data (collectively referred to as IQ data) and control data coming from the baseband processor and the application processor into a serial data stream that can be conveyed by the digital transfer cabling, for instance, a twisted pair cable or an Ethernet cable. At the other end where the RFFE and antennas are located, a deserializer can be used to convert the serial data back into the IQ data and the control data. Moreover, serializer/deserializer (SERDES) circuits can be included on both ends of the cabling to support bidirectional communications between the RF module and the baseband processor.

Multiple RF modules can also be placed through the automobile and be in communication with the baseband processor over the same or different cabling. Accordingly, the RF modules can support antennas deployed throughout an automobile in varying locations.

Figure 5:
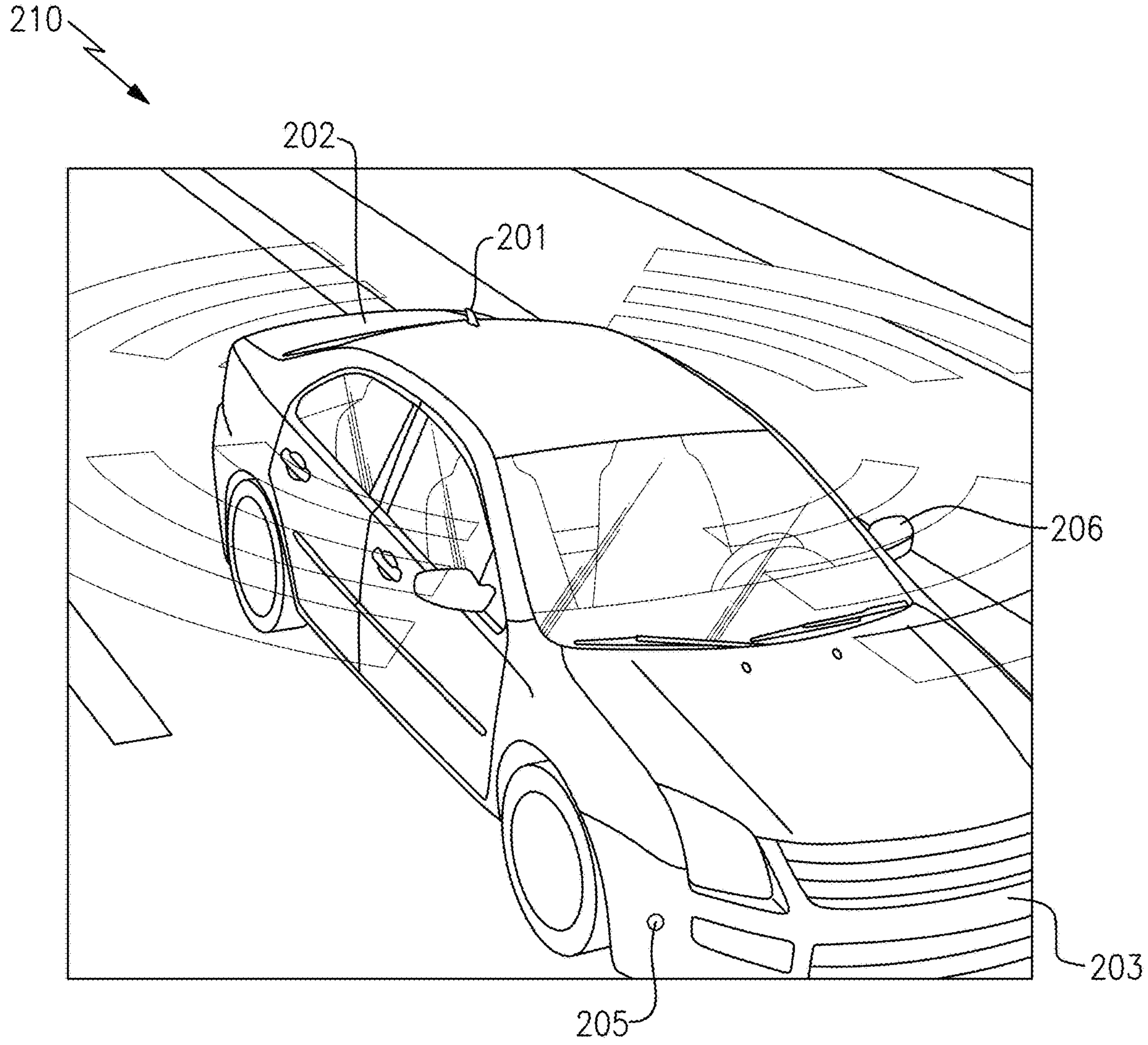
FIG. 5 is a schematic diagram of one embodiment of an automobile.

FIG. 5 is a schematic diagram of one embodiment of an automobile 210. The automobile 210 includes a variety of electronic components used for enhancing performance of the automobile 210 including, for example, a roof mounted fin antenna 201, a rear camera 202, a bumper antenna 203, a radar sensor 205, and a laser collision avoidance sensor 206.

Although one example of electronic components for an automobile 210 are depicted, an automobile can include antennas, sensors, and/or other components implemented in a wide variety of ways.

Figure 6:
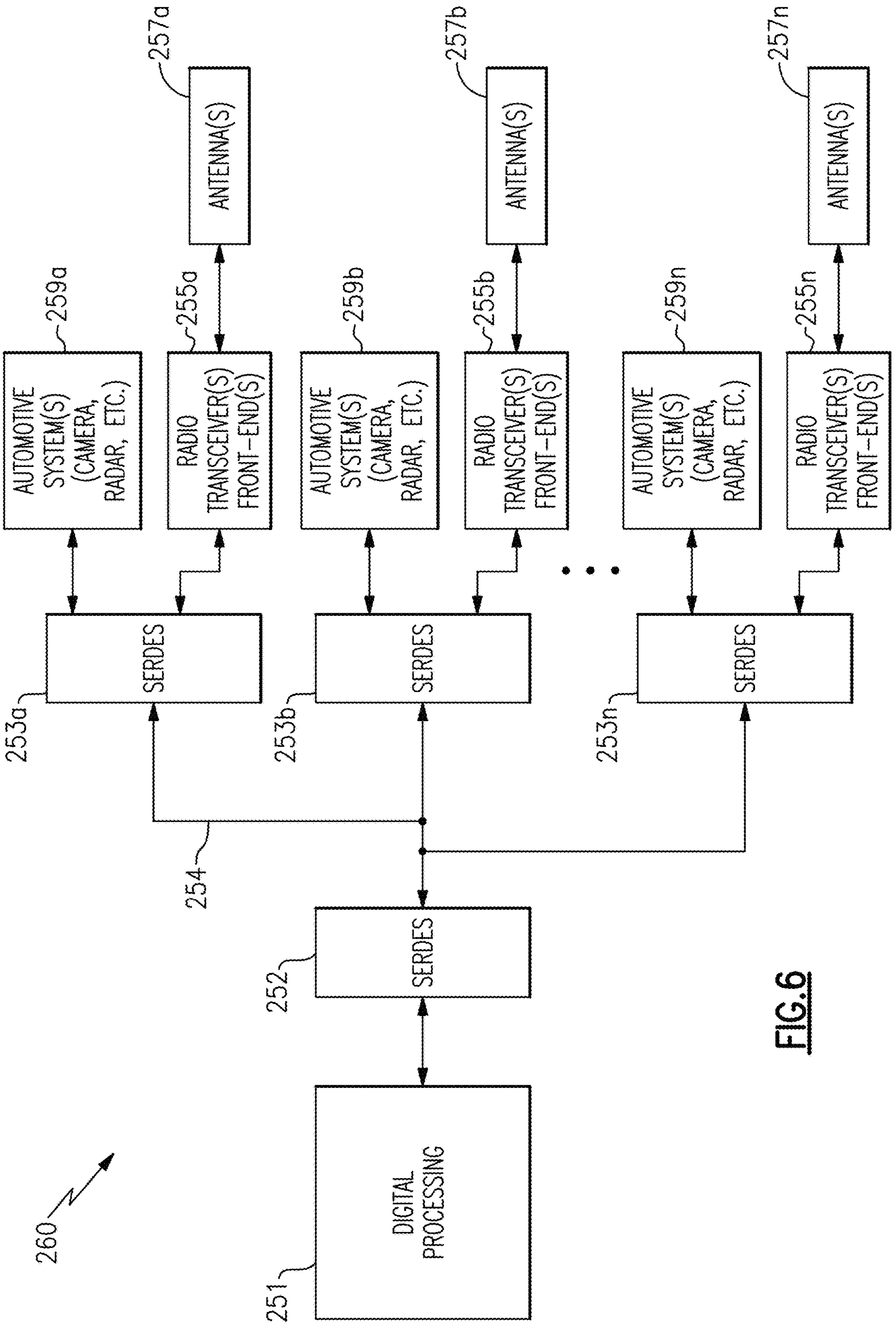
FIG. 6 is a schematic diagram of one embodiment of a distributed radio for an automobile.

FIG. 6 is a schematic diagram of one embodiment of a distributed radio 260 for an automobile. The distributed radio 260 includes a digital processing circuit 251, a source-side SERDES 252, cc SERDES 253*a*, 253*b*, . . . 253*n*, digital cabling 254, radio transceiver(s)/front-end(s) 255*a*, 255*b*, . . . 255*n*, antenna(s) 257*a*, 257*b*, . . . 257*n*, and automotive system(s) 259*a*, 259*b*, . . . 259*n*.

The digital processing circuit 251 can include one or more digital integrated circuits (ICs) for processing data associated with a variety of automotive systems. For example, with respect to cellular communications on the antenna(s) 257*a*, 257*b*, . . . 257*n*, the digital processing circuit 251 can provide functionality associated with baseband processing and/or application processing. The digital processing circuit 251 can also serve other functions as well, such as processing associated with camera, radar, lidar, and/or other functions of the automotive system(s) 259*a*, 259*b*, . . . 259*n*. In one embodiment, the digital processing circuit 251 corresponds to a single processor IC, and baseband and application processor functions are performed by software run on the processor IC. Implementing multiple automotive systems on a single processor reduces a number of electronic control units (ECUs) and associated software domains/programs.

As shown in FIG. 6, the source-side SERDES 252 communicates with the destination-side SERDES 253*a*, v253*b*, . . . 253*n* over the digital cabling 254. Although shown as using shared cabling, in another embodiment, separate cabling is provided between the source-side SERDES 252 and one or more of the destination-side SERDES 253*a*, 253*b*, . . . 253*n*. The digital cabling 254 can be implemented in a wide variety of ways including, but not limited to, a twisted pair cable or an Ethernet cable.

The source-side SERDES 252 communicates with the destination-side SERDES 253*a*, 253*b*, . . . 253*n* and vice versa using digital data streams. Thus, the digital cabling 254 carry digital signals, which results in high noise immunity which permits the digital cabling 254 to be implemented with low cost and/or long length.

Moreover, the digital cabling 254 and associated SERDES are shared between multiple automotive systems in this example, which reduces cable cost relative to an implementation in which certain automotive systems (for instance, a cellular communication system) is implemented with dedicated cabling.

In the illustrated embodiment, the digital processing circuit 251 and the source-side SERDES 252 can be remotely located (for instance, in a cool portion of the car) relative to one or more of the destination-side SERDES 253*a*, 253*b*, . . . 253*n* and associated components. Thus, the destination-side SERDES 253*a*, 253*b*, . . . 253*n* and associated components (for instance, an RF module including a radio transceiver and front-end in communication with an antenna) can be deployed in harsher/higher temperature environments while the digital processing circuit 251 can be placed in a less harsh/lower temperature environment.

Figure 7A:
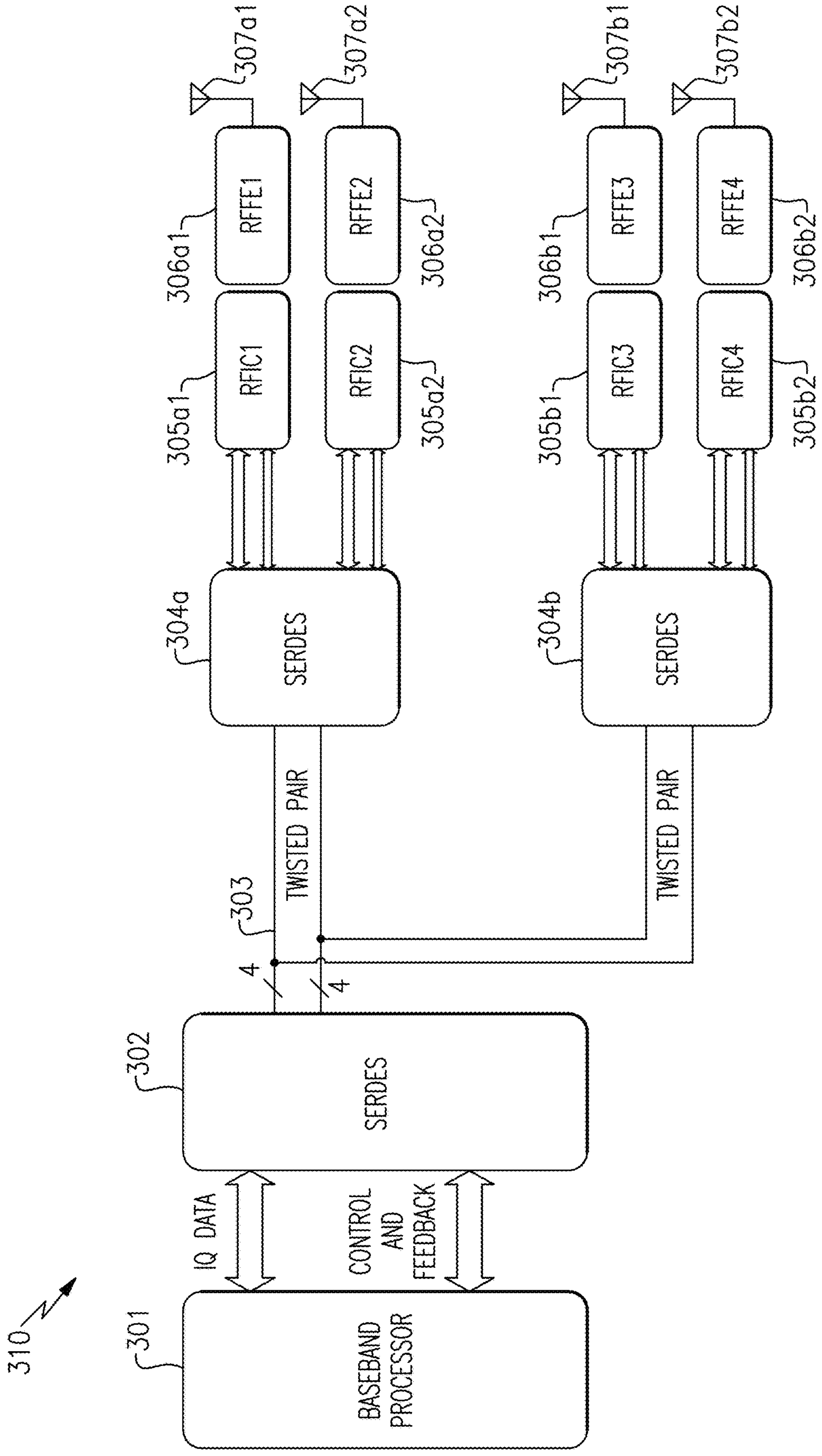
FIG. 7A is a schematic diagram of another embodiment of a distributed radio for an automobile.

FIG. 7A is a schematic diagram of another embodiment of a distributed radio 310 for an automobile. The distributed radio 310 includes a baseband processor 301, a baseband-side SERDES 302, twisted pair cabling 303, a first antenna-side SERDES 304*a*, a first transceiver (also referred to herein as an RFIC) 305*a*1, a first RFFE 306*a*1, a first antenna 307*a*1, a second transceiver 305*a*2, a second RFFE 306*a*2, a second antenna 307*a*2, a second antenna-side SERDES 304*b*, a third transceiver 305*b*1, a third RFFE 306*b*1, a third antenna 307*b*1, a fourth transceiver 305*b*2, a fourth RFFE 306*b*2, and a fourth antenna 307*b*2.

Although the distributed radio 310 is depicted as including one baseband processor, one baseband-side SERDES, two antenna-side SERDES, four transceivers, four RFFEs, and four antennas, any number of components are possible. Moreover, the correspondence between components (for instance, the number of antennas associated with an RFFE, the number of RFFEs associated with a transceiver, and/or the number of transceivers associated with a SERDES) can be different. Furthermore, one or more of the antenna-side SERDES can communicate with the baseband-SERDES over separate cabling and/or other automotive system(s) can share the SERDES and digital cabling to reduce component and/or cabling cost.

As shown in FIG. 7A, with respect to transmit, the baseband-side SERDES 302 converts all IQ and control data coming from the baseband processor and the application processor (not shown in FIG. 7A) into a serial data stream that can be conveyed by the twisted pair 202 to the antenna-side SERDES 304*a*-304*b*. The SERDES 304*a*-304*b* convert the serial data back into the IQ data and the control data for the transceivers. With respect to receive, the SERDES 304*a*-304*b* convert IQ data (and any other data, such as feedback data) from the transceivers to serial data streams that are provided to the baseband-side SERDES 302, which recovers the IQ data (and any other data) and provides the recovered data to the baseband processor 301.

In one embodiment, the distributed radio 310 is implemented with emergency (cCall) functionality, and the RFFEs and antennas are implemented to transmit on a sufficient number of frequency bands to send an emergency signal to request rapid assistance for a road traffic incident.

Figure 7B:
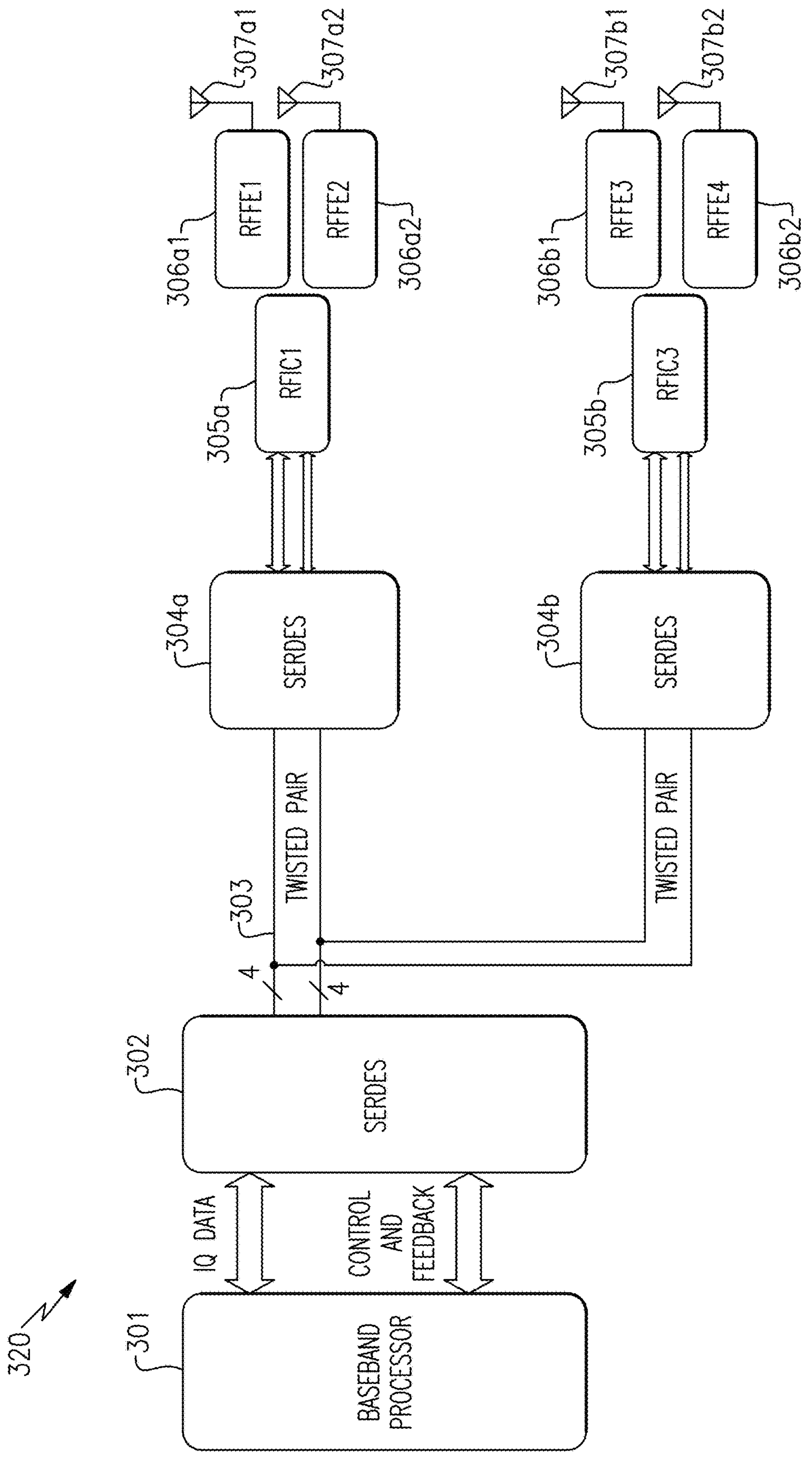
FIG. 7B is a schematic diagram of another embodiment of a distributed radio for an automobile.

FIG. 7B is a schematic diagram of another embodiment of a distributed radio 320 for an automobile. The distributed radio 320 includes a baseband processor 301, a baseband-side SERDES 302, twisted pair cabling 303, a first antenna-side SERDES 304*a*, a first transceiver 305*a*, a first RFFE 306*a*1, a first antenna 307*a*1, a second RFFE 306*a*2, a second antenna 307*a*2, a second antenna-side SERDES 304*b*, a second transceiver 305*b*, a third RFFE 306*b*1, a third antenna 307*b*1, a fourth RFFE 306*b*2, and a fourth antenna 307*b*2.

The distributed radio 320 of FIG. 7B is similar to the distributed radio 310 of FIG. 7A, except that cach transceiver in the distributed radio 320 communicates with two RFFEs.

Although the embodiments herein depict certain numbers and correspondences between components, other numbers of components and/or correspondence between components (for instance, the number of antennas associated with an RFFE, the number of RFFEs associated with a transceiver, and/or the number of transceivers associated with a SERDES) are possible.

Figure 7C:
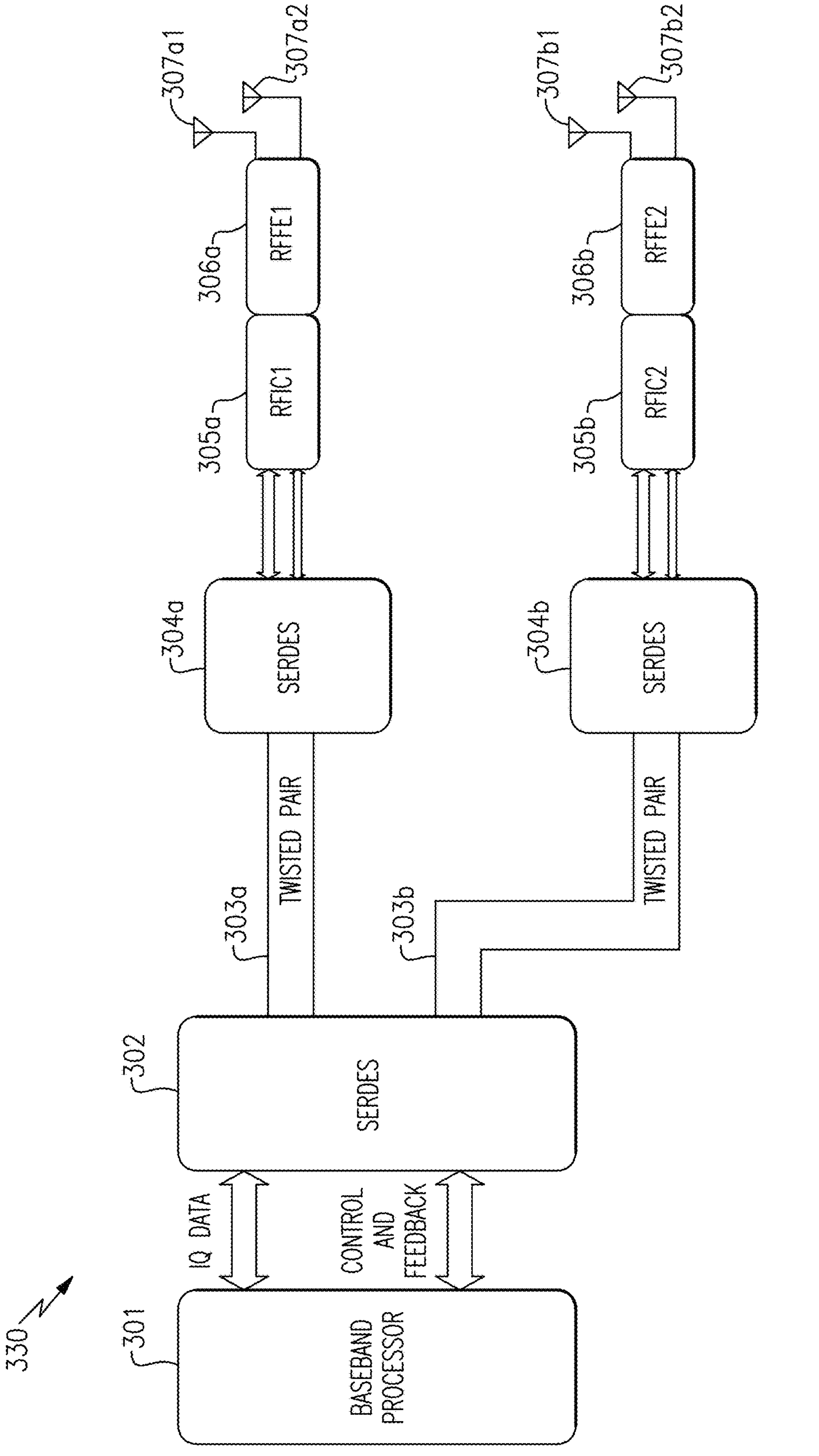
FIG. 7C is a schematic diagram of another embodiment of a distributed radio for an automobile.

FIG. 7C is a schematic diagram of another embodiment of a distributed radio 330 for an automobile. The distributed radio 330 includes a baseband processor 301, a baseband-side SERDES 302, a first twisted pair cable 303*a,* a second twisted pair cable 303*b*, a first antenna-side SERDES 304*a,* a first transceiver 305*a,* a first RFFE 306*a,* a first antenna 307*a*1, a second antenna 307*a*2, a second antenna-side SERDES 304*b,* a second transceiver 305*b,* a second RFFE 306*b,* a third antenna 307*b*1, and a fourth antenna 307*b*2.

In this embodiment, separate twisted pair cables are used between each antenna-side SERDES and the baseband-side SERDES. Additionally, two antennas are associated with each RFFE, in this example. The distributed radios herein can use any suitable number of components and/or correspondence between components.

Figure 8:
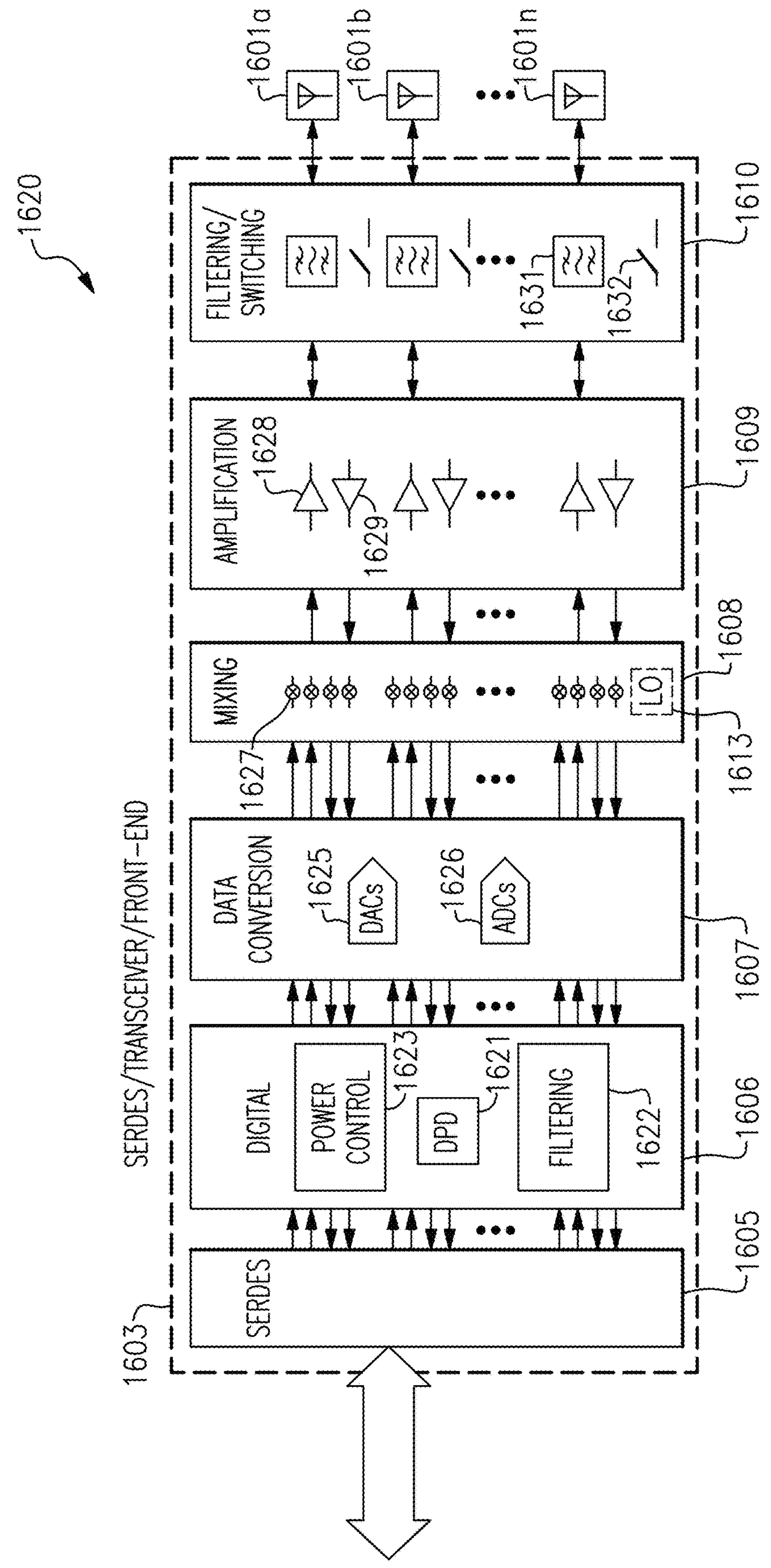
FIG. 8 is a schematic diagram of another embodiment of a portion of a distributed radio for an automobile.

FIG. 8 is a schematic diagram of another embodiment of a portion of a distributed radio 1620 for an automobile. The portion of a distributed radio 1620 includes a module 1603 and antennas 1601*a,* 1601*b*, . . . 1601*n.*

The module 1603 can include a substrate with one or more dies and one or components attached thereto. The die(s)/component(s) operate to provide SERDES 1605, a digital circuit 1606 (implemented with power control 1623, digital pre-distortion 1621, and digital filtering 1622, in this example), a data conversion circuit 1607 (including digital-to-analog converters 1626 for digitizing digital transmit data to generate analog transmit signals for transmission and analog-to-digital converters 1622 for digitizing analog receive signals to generate digital receive data), a mixing circuit 1608 (also referred to as frequency upconversion/downconversion and including mixers 1627 and a local oscillator (LO) 1613 for upconverting analog transmit signals to generate RF transmit signals and for downconverting RF receive signals to generate analog receive signals, in this example) an amplification circuit 1609 (which can include power amplifiers, low noise amplifiers, variable gain amplifiers and/or other amplifiers for amplifying the RF transmit signals and RF receive signals), and/or a filtering/switching circuit 1610 (for filtering the RF transmit signals and RF receive signals, before and/or after amplification).

The module 1603 can be included in any of the distributed radios herein. The module 1603 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The SERDES circuit 1605 includes a deserializer for recovering digital transmit data received from digital cabling, and a serializer for sending digital receive data over the digital cabling.

The digital transmit circuit 1606 operates in combination with the data conversion circuit 1607 and the mixing circuit 1608 to process digital transmit data to generate RF signals for transmission and to process incoming RF signals received from the antennas to generate digital receive data. The digital transmit circuit 1606 can provide a number of functionalities, such as digital pre-distortion (DPD) 1621, digital filtering 1622, and/or digital power control 1623.

The amplification circuit 1609 and the filtering/switching circuit 1610 can operate as part of a front-end to provide amplification, filtering, and selection of RF signals. Although examples of front-end components and functionalities are shown, a front-end system can provide a number of functionalities, including, but not limited to, amplifying signals for transmission, amplifying received signals, filtering signals, attenuating signals, switching between different bands, switching between different power modes, switching between transmission and receiving modes, duplexing of signals, multiplexing of signals (for instance, diplexing or triplexing), or some combination thereof.

In certain implementations, the module 1620 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 1601*a,* 1601*b*, . . . 1601*n* can include antennas used for a wide variety of types of communications. For example, the antennas 1601*a,* 1601*b*, . . . 1601*n* can include antennas for transmitting and/or receiving signals associated with a wide variety of frequencies and communications standards.

In certain implementations, the antennas 1601*a,* 1601*b*, . . . 1601*n* support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

An automobile can operate with beamforming in certain implementations. For example, the module 1620 can include amplifiers having controllable gain and phase shifters having controllable phase to provide beam formation and directivity for transmission and/or reception of signals using the antennas 1601*a,* 1601*b*, . . . 1601*n*. For example, in the context of signal transmission, the amplitude and phases of the transmit signals provided to the antennas 1601*a,* 1601*b*, . . . 1601*n* are controlled such that radiated signals from the antennas 1601*a,* 1601*b*, . . . 1601*n* combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 1601*a,* 1601*b*, . . . 1601*n* from a particular direction. In certain implementations, the antennas 1601*a,* 1601*b*, . . . 1601*n* include one or more arrays of antenna elements to enhance beamforming.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A distributed radio frequency communication system for an automobile, the distributed radio frequency communication system comprising:
- a first cellular system including a first antenna, a first cellular transceiver, and a first cellular radio frequency front end electrically connected between the first cellular transceiver and the first antenna;
- a baseband-side serializer/deserializer circuit;
- shared twisted pair cabling;
- a first antenna-side serializer/deserializer circuit electrically connected to the first cellular transceiver and configured to communicate a first serial data stream to the baseband-side serializer/deserializer circuit over the shared twisted pair cabling;
- a second cellular system including a second cellular transceiver;
- a second antenna-side serializer/deserializer circuit electrically connected to the second cellular transceiver and configured to communicate a second serial data stream to the baseband-side serializer/deserializer circuit over the shared twisted pair cabling.

2. The distributed radio frequency communication system of claim 1, further comprising a cellular baseband processer electrically connected to the baseband-side serializer/deserializer circuit and configured to receive data from the first serial data stream and the second serial data stream.

3. The distributed radio frequency communication system of claim 1, wherein the first cellular transceiver is configured to generate in-phase data and quadrature-phase cellular data based on a cellular radio frequency receive signal from the first cellular radio frequency front end, and to generate the first serial data stream based on the in-phase data and quadrature-phase cellular data.

4. The distributed radio frequency communication system of claim 1, further comprising an automotive system electrically connected to the first antenna- side serializer/deserializer circuit, the first serial data stream communicated over the shared twisted pair cabling including both cellular data from the first cellular transceiver and automotive data from the automotive system.

5. The distributed radio frequency communication system of claim 4, wherein the automotive system includes a radar.

6. The distributed radio frequency communication system of claim 1, wherein the second cellular system further includes further comprising a second antenna and a second cellular radio frequency front end electrically connected between the second cellular transceiver and the second antenna.

7. The distributed radio frequency communication system of claim 1, wherein the first antenna is positioned on a roof, a bumper, a trunk or a mirror of the automobile.

8. The distributed radio frequency communication system of claim 1, further comprising a cellular baseband processor in a first location of the automobile and electrically connected to the baseband-side serializer/deserializer circuit, the first cellular radio frequency front end being in a second location of the automobile separated from the first location.

9. The distributed radio frequency communication system of claim 8, wherein the first location is of a lower temperature than the second location.

10. A method of distributed radio frequency communication in an automobile, the method comprising:
- communicating a first serial data stream from a first antenna-side serializer/deserializer circuit to a baseband-side serializer/deserializer circuit over shared twisted pair cabling, the first antenna-side serializer/ deserializer circuit electrically connected to a first cellular transceiver of a first cellular system;

receiving a first cellular radio frequency receive signal on a first antenna of the first cellular system;

amplifying the first cellular radio frequency receive signal using a first cellular radio frequency front end of the first cellular system, the first cellular radio frequency front end electrically connected between the first cellular transceiver and the first antenna; and communicating a second serial data stream from a second antenna-side serializer/deserializer circuit to the baseband-side serializer/deserializer circuit over the shared twisted pair cabling, the second antenna-side serializer/deserializer circuit electrically connected to a second cellular transceiver of a second cellular system.

11. The method of claim 10, further comprising receiving data from the first serial data stream and the second serial data stream at a cellular baseband processer that is electrically connected to the baseband-side serializer/deserializer circuit.

12. The method of claim 10, further comprising using the first cellular transceiver to generate in-phase data and quadrature-phase cellular data based on the first cellular radio frequency receive signal, and generating the first serial data stream based on the in- phase data and quadrature-phase cellular data.

13. The method of claim 10, further comprising receiving a second cellular radio frequency signal at a second antenna of the second cellular system, and amplifying the second cellular radio frequency receive signal using a second cellular radio frequency front end of the second cellular system, the second cellular radio frequency front end electrically connected between the second cellular transceiver and the second antenna.

14. The method of claim 10, wherein the first antenna is positioned on a roof, a bumper, a trunk or a mirror of the automobile.

15. The method of claim 10, wherein the first serial data stream communicated over the shared twisted pair cabling includes both cellular data from the first cellular transceiver and automotive data from an automotive system that is electrically connected to the first antenna-side serializer/deserializer circuit.

16. The method of claim 15, wherein the automotive system includes a radar.

17. An automobile comprising:

a first cellular system including a first antenna, a first cellular transceiver, and a first cellular radio frequency front end electrically connected between the first cellular transceiver and the first antenna;

a baseband-side serializer/deserializer circuit;

shared twisted pair cabling;

a first antenna-side serializer/deserializer circuit electrically connected to the first cellular transceiver and configured to communicate a first serial data stream to the baseband-side serializer/deserializer circuit over the shared twisted pair cabling;

a second cellular system including a second cellular transceiver;

a second antenna-side serializer/deserializer circuit electrically connected to the second cellular transceiver and configured to communicate a second serial data stream to the baseband-side serializer/deserializer circuit over the shared twisted pair cabling; and an automotive system electrically connected to the first antenna-side serializer/deserializer circuit, the first serial data stream communicated over the shared twisted pair cabling including both cellular data from the first cellular transceiver and automotive data from the automotive system.

18. The automobile of claim 17, further comprising a cellular baseband processor in a first location of the automobile and electrically connected to the baseband- side serializer/deserializer circuit, the first cellular radio frequency front end being in a second location of the automobile separate from the first location.

19. The automobile of claim 18, wherein the first location is of a lower temperature than the second location.

20. The automobile of claim 17, wherein the at least one-automotive system includes a radar.

* * * * *